US012149023B2

(12) United States Patent
Burrow et al.

(10) Patent No.: US 12,149,023 B2
(45) Date of Patent: Nov. 19, 2024

(54) WET MATEABLE HYBRID SUBSEA CONNECTOR

(71) Applicant: Siemens Energy Global GmbH & Co. KG, Munich (DE)

(72) Inventors: Christopher Burrow, Ulverston (GB); Daniel Walton, Carnforth (GB)

(73) Assignee: Siemens Energy Global GmbH & Co. KG, Munich (DE)

(*) Notice: Subject to any disclaimer, the term of this patent is extended or adjusted under 35 U.S.C. 154(b) by 344 days.

(21) Appl. No.: 17/694,815

(22) Filed: Mar. 15, 2022

(65) Prior Publication Data

US 2022/0302637 A1 Sep. 22, 2022

(30) Foreign Application Priority Data

Mar. 17, 2021 (GB) ..................................... 2103663
Mar. 17, 2021 (GB) ..................................... 2103664
Mar. 17, 2021 (GB) ..................................... 2103666
Mar. 17, 2021 (GB) ..................................... 2103667
Mar. 17, 2021 (GB) ..................................... 2103668
Mar. 17, 2021 (GB) ..................................... 2103669

(51) Int. Cl.
*H01R 13/523* (2006.01)
*H01R 13/24* (2006.01)
(Continued)

(52) U.S. Cl.
CPC ....... *H01R 13/523* (2013.01); *H01R 13/2421* (2013.01); *H01R 13/2471* (2013.01); *H01R 13/502* (2013.01); *H01R 13/5202* (2013.01); *H01R 13/5219* (2013.01); *H01R 13/5227* (2013.01); *H01R 13/533* (2013.01); *H01R 13/6271* (2013.01); *H01R 13/629* (2013.01); *H01R 13/62961* (2013.01);
(Continued)

(58) Field of Classification Search
None
See application file for complete search history.

(56) References Cited

U.S. PATENT DOCUMENTS 3,742,427 A 6/1973 Ballard
4,142,770 A 3/1979 Butler, Jr. et al.
6,464,405 B2 10/2002 Cairns et al.
7,163,417 B2 * 1/2007 Brodin ............ H01R 13/65912 439/457
7,736,159 B1 * 6/2010 Effinger, III .......... H01R 24/86 439/607.05
(Continued)

FOREIGN PATENT DOCUMENTS

FR 2895577 A1 6/2007
GB 2338119 A 12/1999
WO 2021037949 A1 3/2021

*Primary Examiner* — Oscar C Jimenez
(74) *Attorney, Agent, or Firm* — Wolter Van Dyke Davis, PLLC

(57) ABSTRACT

A subsea wet mateable connector plug part includes a plug body, a plurality of data conductor contacts arranged in the plug body and a plurality of power conductor contacts arranged in the plug body. The data conductor contacts include an even number of pairs of data conductor contacts, each pair being aligned orthogonally with respect to an adjacent pair of data conductor contacts. The pairs of data conductor contacts are so arranged as to form a data cluster. The data cluster includes an outer earth screen adapted to maintain an electrical contact with an earth screen of a cable. The power conductor contacts are spaced from one another in the plug body, outside of and remote from the outer earth screen of the data cluster.

9 Claims, 8 Drawing Sheets

(51) Int. Cl.

| | |
|---|---|
| ***H01R 13/502*** | (2006.01) |
| ***H01R 13/52*** | (2006.01) |
| ***H01R 13/533*** | (2006.01) |
| ***H01R 13/627*** | (2006.01) |
| ***H01R 13/629*** | (2006.01) |
| ***H01R 24/86*** | (2011.01) |
| *H01R 13/622* | (2006.01) |
| *H01R 13/66* | (2006.01) |

(52) U.S. Cl.

CPC ........... *H01R 24/86* (2013.01); *H01R 13/622* (2013.01); *H01R 13/6675* (2013.01); *H01R 2201/04* (2013.01); *H01R 2201/26* (2013.01)

(56) References Cited

U.S. PATENT DOCUMENTS

| | | | | |
|---|---|---|---|---|
| 9,508,467 | B2 * | 11/2016 | Pon | H01B 9/003 |
| 10,014,678 | B2 | 7/2018 | Barrett et al. | |
| 10,249,411 | B2 * | 4/2019 | Kunz | H01B 11/20 |
| 10,704,353 | B2 | 7/2020 | Painter et al. | |
| 11,336,058 | B2 * | 5/2022 | Liptak | H01B 11/06 |
| 2007/0259568 | A1 | 11/2007 | Mackillop et al. | |
| 2010/0319956 | A1 * | 12/2010 | Ballard | H01B 9/003 174/105 R |
| 2016/0233608 | A1 * | 8/2016 | Burrow | H01R 13/5213 |
| 2022/0190525 | A1 * | 6/2022 | Hammerling | H01R 13/502 |
| 2022/0336996 | A1 * | 10/2022 | Burrow | H01R 33/94 |

* cited by examiner

WET MATEABLE HYBRID SUBSEA CONNECTOR

CROSS REFERENCE TO RELATED APPLICATIONS

This application claims the benefit of United Kingdom Application Nos. GB 2103663.7, GB 2103664.5, GB 2103666.0, GB 2103667.8, GB 2103668.6, GB 2103669.4 all filed on 17 Mar. 2021, and all incorporated by reference herein in their entirety.

FIELD OF INVENTION

This invention relates to a subsea, or underwater, connector and a method of operating the connector.

BACKGROUND OF INVENTION

Subsea, or underwater, connectors are designed to operate beneath the surface of the water. Typically, a subsea connector comprises two parts, generally known as plug and receptacle. The receptacle may include one or more conductor pins and the plug may include corresponding plug sockets for the receptacle conductor pins. The connection may be made topside (dry-mate), or subsea (wet-mate) and the specific design is adapted according to whether the connector is a wet-mate or dry-mate connector. Subsea connectors have various applications including power connectors which supply power to subsea equipment, or control and instrumentation connectors which exchange data between different pieces of subsea equipment, or between subsea equipment and topside devices.

However, many variants of wet mate connector each of which may be designed to use different mating methods either result in delays in manufacturing to order, or require a large inventory to be stoked. An improved wet-mateable connector is desirable.

SUMMARY OF INVENTION

In accordance with a first aspect of the present invention, a subsea wet mateable connector plug part, the plug part comprising a plug body; a plurality of data conductor contacts arranged in the plug body; a plurality of power conductor contacts arranged in the plug body; wherein the data conductor contacts comprise an even number of pairs of data conductor contacts, each pair being aligned orthogonally with respect to an adjacent pair of data conductor contacts; wherein the pairs of data conductor contacts so arranged, form a data cluster; wherein the data cluster comprises an outer earth screen adapted to maintain an electrical contact with an earth screen of a cable; wherein the power conductor contacts are spaced from one another in the plug body, outside of and remote from the outer earth screen of the data cluster.

The orthogonal arrangement minimises cross talk between adjacent pairs of conductor contacts and the data cluster outer earth screen provides electrical screening from the power conductor contacts.

The plug part may further comprise a plug data cluster earth screen extension, electrically coupled to the outer earth screen and recessed in the plug body.

This provides electrical continuity between an earth screen of a cable dry mated to the connector and a dry mate connector cap of the plug part.

The plug part may further comprise a plug data cluster front end earth screen, electrically coupled to the earth screen extension and/or outer earth screen and wrapped around the plug data contacts rearward of tips of the plug data contacts.

This provides screening for the conductors within the connector body.

The plug part may further comprise an electrical penetrator pin mounted radially outwardly of the front end earth screen and earth screen extension to provide electrical continuity between the front end earth screen and earth screen extension The front end earth screen may comprise a metallic sheet surrounding at least a part of the length of the data cluster contacts.

The plug part may further comprise a plug housing; and seals to seal the plug body in the plug housing.

The plug part may further comprise an elastomeric diaphragm mounted radially outward of the plug body.

In accordance with a second aspect of the present invention, a subsea wet mateable connector receptacle comprises a receptacle body; a plurality of data conductor pins arranged in the receptacle body; a plurality of power conductor pins arranged in the receptacle body; wherein the data conductor pins comprise an even number of pairs of data conductor pins, each pair being aligned orthogonally with respect to an adjacent pair of data conductor pins; wherein the pairs of data conductor pins so arranged form a data cluster; and, wherein the power conductor pins are spaced from one another in the receptacle body, outside of and remote from the data cluster.

The receptacle part may further comprise a receptacle back end comprising data cluster contacts corresponding to the data conductor pins of the data cluster; and an earth screen extension, adapted to be electrically coupled to an outer earth screen of a cable, the earth screen extension being mounted in the back end of the receptacle body.

The receptacle part may further comprise a receptacle housing; and seals to seal the receptacle body to the receptacle housing.

To increase the power rating, the power conductor pins may have a greater diameter than the plug conductor pins and the diameter of the contacts within the plug may be adapted accordingly, but this adds cost and complication, so advantageously, the power conductor pins and the plug conductor pins have the same diameter.

In accordance with a third aspect of the present invention, a wet mateable connector comprises a plug part and a receptacle part; the plug part comprising a plug part according to the first aspect; the receptacle part comprising a receptacle part according to the second aspect.

In accordance with a fourth aspect of the present invention, a wet mateable connector arrangement comprises a connector according to the third aspect; the connector further comprising a first data cable coupled to the plug part and a second data cable coupled to the receptacle part; a first power cable coupled to the plug part and a second power cable coupled to the receptacle part.

Each power conductor contact and data conductor contact of the plug may be coupled to a single core of the respective first cables and each power conductor pin and data conductor pin of the receptacle may be coupled to a single core of the respective second cables.

The coupling may comprise dry-mating or soldering.

BRIEF DESCRIPTION OF THE DRAWINGS

An example of a subsea connector and associated method in accordance with the present invention will now be described with reference to the accompanying drawings in which.

DETAILED DESCRIPTION OF INVENTION

Figure 1:
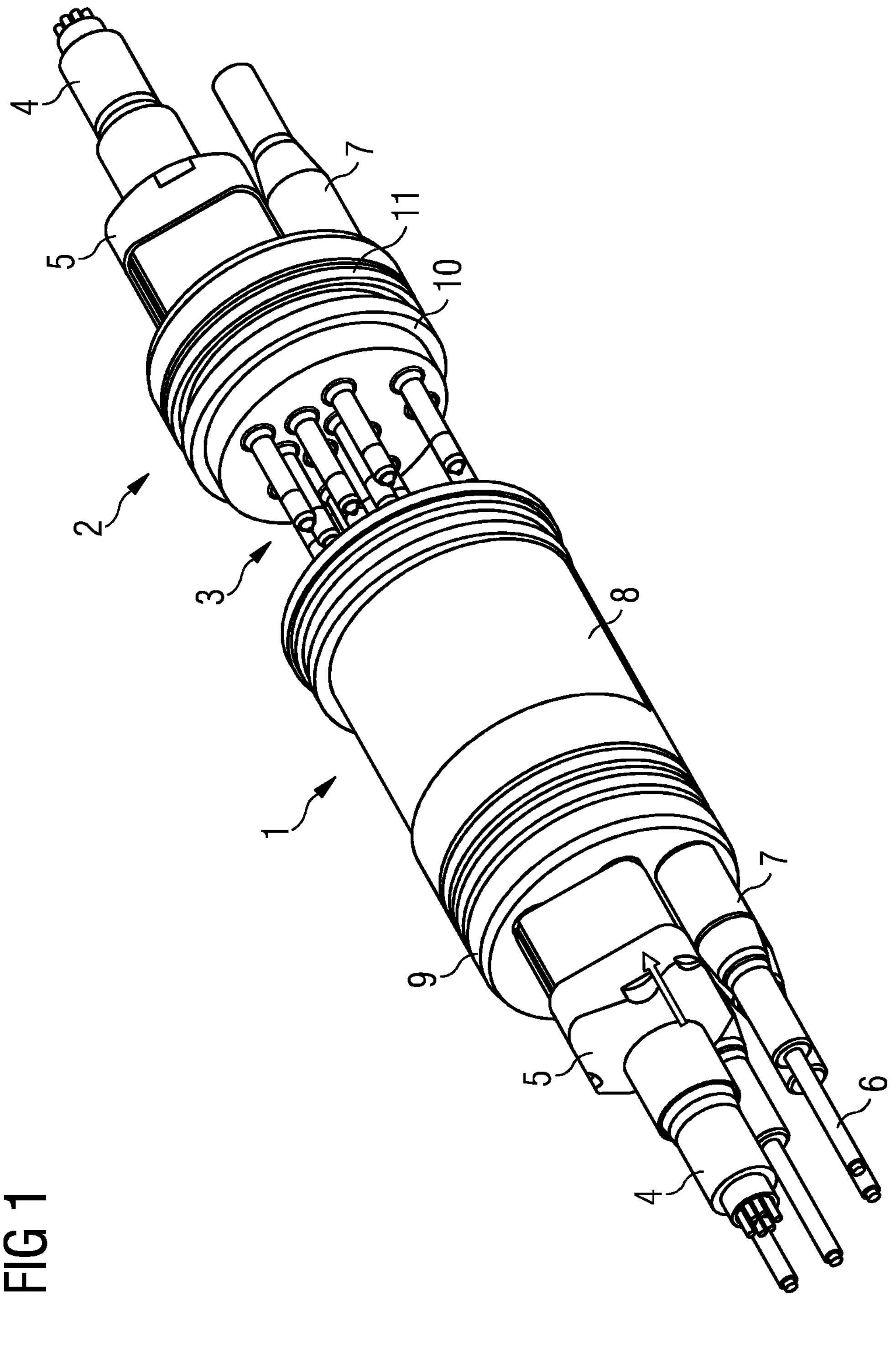
FIG. 1 illustrates an example of a combined power and communication connector according to the present invention, in its unmated state.

The drive to reduce overall lifecycle costs, both capital expenditure (CAPEX) and operational expenditure (OPEX), associated with new deep-water oil and gas developments means that improvements to existing designs, manufacturing processes and operation are desirable. Subsea connector systems are desired that have a lower cost, can be relatively quickly and easily installed and that have reduced maintenance requirements, or need for intervention which affects the systems to which they are connected throughout their working life. Thus, connectors which continue to perform without degradation, over a longer period of time, are desirable.

Typically, connectors for different applications may be single or multi-way connectors. For example, a 4-way connector may be used for delivering power, or a 12-way connector for data transfer via a suitable subsea instrumentation interface standard. This may be level 1, for analogue devices, level 2 for digital serial devices, e.g CANopen, or level 3. using Ethernet TCP/IP. Other data connectors, include optical fibre connectors. Wet mateable controls connectors typically have large numbers of thin conductor pins, in order that multiple control signals to different parts of a product can be included in a single control cable. For example, multiple subsea sensors on different pieces of equipment, such as flow sensors, temperature sensors, or pressure sensors each need to have a separate communication path, so that they can be interrogated, monitored and if necessary, actuators can be energised, for example to open or close a valve, or to start or stop a pump. Power transmission may be required for the purpose of supplying power to subsea equipment to enable it to operate, for example to close a valve, or drive a pump. Wet mateable power connectors may have a single pin and socket arrangement, or may be multi-way connectors, but typically with fewer, larger, pins than a control or communications connector.

Subsea connectors combining data and power conductors may suffer from crosstalk or interference. The present invention addresses these problems to improve signal performance. A first aspect is to adapt the pitch, layout and location of the data conductor pins to address these problems and also to adapt the relative location of the data conductors with respect to the power conductors. A further aspect is to continue screening which is provided in the cable, from the cable break out, toward the connector. Optionally, this screening may be continued into the connector, to a greater or lesser extent, examples of which are described hereinafter. These aspects are particularly applicable for improving communication performance in the field of a controls connector specifically designed to have a higher bandwidth performance, when power and communication or data conductors, to analogue, digital, or Ethernet standards, as described above, are combined in a single connector, for subsea applications.

A hybrid controls connector comprises dedicated communication or data conductors and power conductors. Typically, a hybrid connector of this type comprises a 12 pin, or 12-way, connector, although other numbers of conductor pins are possible. Operation of the connector involves simultaneous data and power use. The present invention provides a connector at a lower cost, but with faster lead time and improved communications performance, i.e., the data bandwidth, than has been possible to date.

Any such connector needs to optimise the physical arrangement of the conductor pins, as space is at a premium in subsea applications and the connectors must often fit within predetermined size constraints. However, the arrangement needs to keep the power pins as far as possible from the data pins, within the overall size constraint. Conventionally, all pins in a hybrid 12-way connector have been of equal diameter and evenly spaced out in the connector body. Some pins were allocated for power transmission, others for data transmission, but the pins were otherwise indistinguishable.

In the present invention, data pins are arranged in pairs, adjacent pairs being orthogonal to one another to reduce crosstalk between the data pairs. The layout of multiple adjacent data pairs forms a data cluster 50 as set out in more detail below and shown in the figures. Separate power pins 6 are evenly spaced from one another and each power pin is located at the greatest distance from the edge of the data cluster 50 that can be achieved within the constraints of the connector body. For simplicity of supply and manufacture, the connector may still use identical conductor pins 23, 6 for both power and data, but the layout now provides a clear distinction between power and data pins. Using the same diameter for all the pins limits the power rating, but simplifies manufacturing, keeping unique part count to a minimum. For increased power rating, power pins with a larger diameter than the diameter of the data pins may be provided, either with standard data pins, or thinner than standard data pins, to reduce the overall size of the data cluster and give more space for the larger power pins. However, this complicates the supply and manufacture and is not as advantageous an option as keeping all the pins the same size.

Further improvements are provided by means of an earth screen 5 around the data cluster 50. This data screen is a single screen around all of the conductors of the data cluster. An earth screen which completely encompasses the pins and contacts of the data cluster without breaks is optimum and enables the highest bandwidth performance by spanning the length of the plug or receptacle connector, to entirely prevent stray capacitive and inductive interference effects impairing the performance of the data conductor pairs. However, as this is a technically demanding structural requirement, because the screen in such an arrangement effectively separates the data cluster 50 from the external mounting/sealing structures, then a number of smaller earth screen extension options 24 are also proposed. These earth screen extension still substantially surround the data conductor pairs in the data cluster and exclude the power conductors outside the data cluster, but enable the manufacturing to be done more easily.

The full earth screen example may be manufactured using additive manufacturing techniques, rather than moulding to achieve the structural integrity to be able to accommodate differential pressure, prevent leak paths and maintain positional accuracy. The partial earth screen examples 24 may be manufactured using moulding techniques, as described hereinafter. The partial earth screen options may include earth screening 5 of the cable break out region to reduce electrical noise, extended earth screening 24 around the data cluster, particularly inside the plug connector, use of a built-in penetrator pin 28 to electrically connect front and rear earth screens across an environmental barrier inside the plug connector and a simple method for obtaining electrical continuity between an earth cap and the earth screen, such as a spring contact. As a minimum, it is desirable that there is earth screen continuity 15 from the cable break out region to the dry mate connector cap. The further extensions 24, 25, 26 of the shielding into the connector, or around the communications pins within the connector are optional.

FIG. 1 illustrates an example of a connector for connecting both power and communications cables in the same connector, showing the connector in its de-mated state. Communications cables 4, in this example, 8-core cables, are provided with an electrical earth shield 5 and mounted to a back end of a body 9, 10 of each of a plug 1 and a receptacle 2. The example illustrated uses identical power and communications pins 3 at the front end of the receptacle body which are adapted to engage electrically and mechanically with contact sockets (shown in FIG. 9) in a front end of the plug body 9. In some circumstances, larger diameter pins may be used for the power pins, to increase the rated power, but this adds cost and complexity in manufacturing, as the sockets must be adapted accordingly and the parts are no longer universal, so having all the pins the same diameter is advantageous. The plug body 9 is surrounded by a diaphragm 8. Power connections 6 in individual sheaths 7 are provided to the back end of the plug body 9 and to the back end of the receptacle body 10. In this example, four power connections 6 are provided to each, although not all are visible in this view. Seals 11 are provided around the outside of the plug body 9 and the receptacle body 10 to seal to the inner surface of a housing (not shown).

Figure 2:
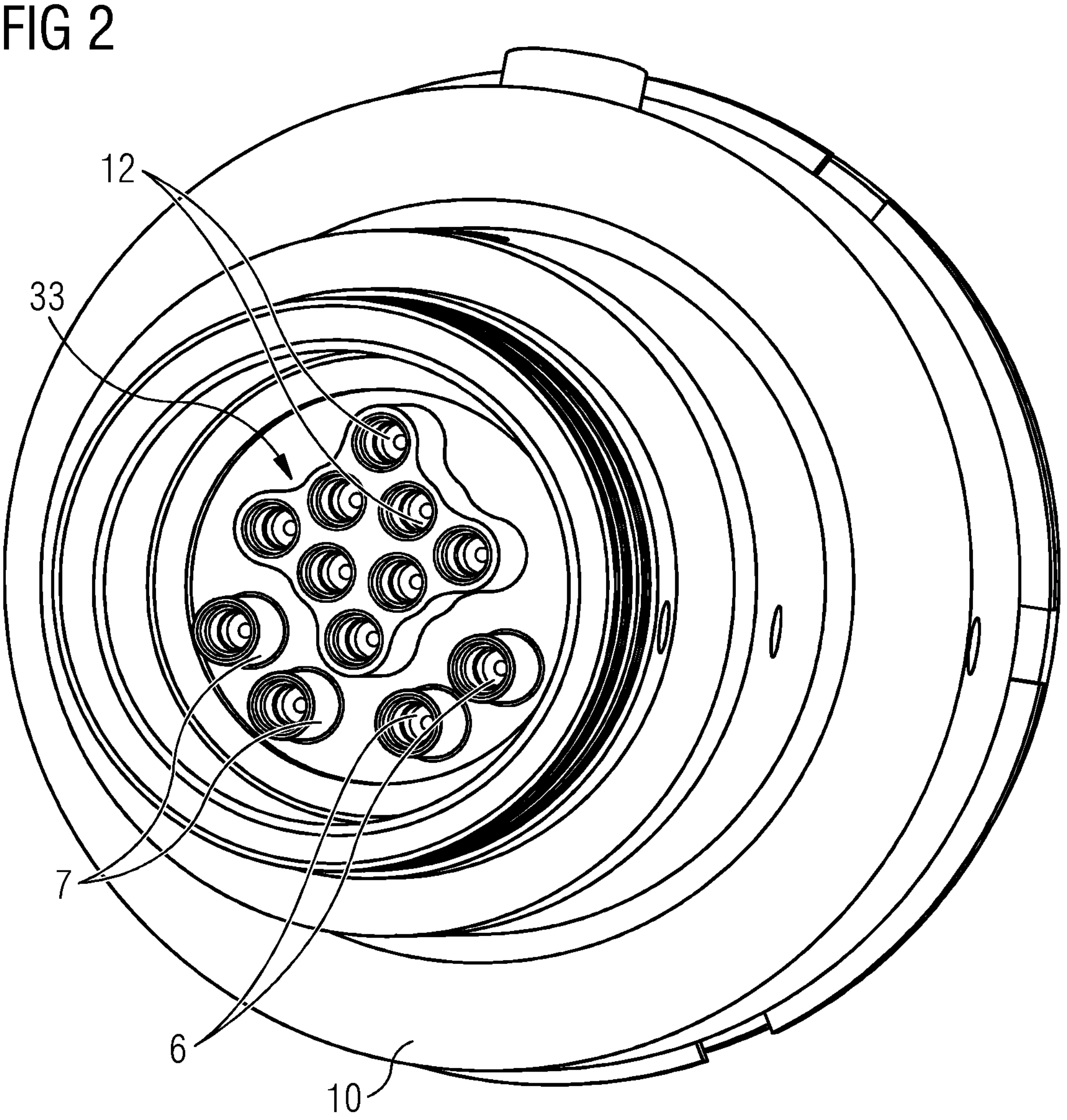
FIG. 2 illustrates an example of the relative location in a back end of a receptacle of communications and power conductors in a connector according to the present invention.
Figure 3:
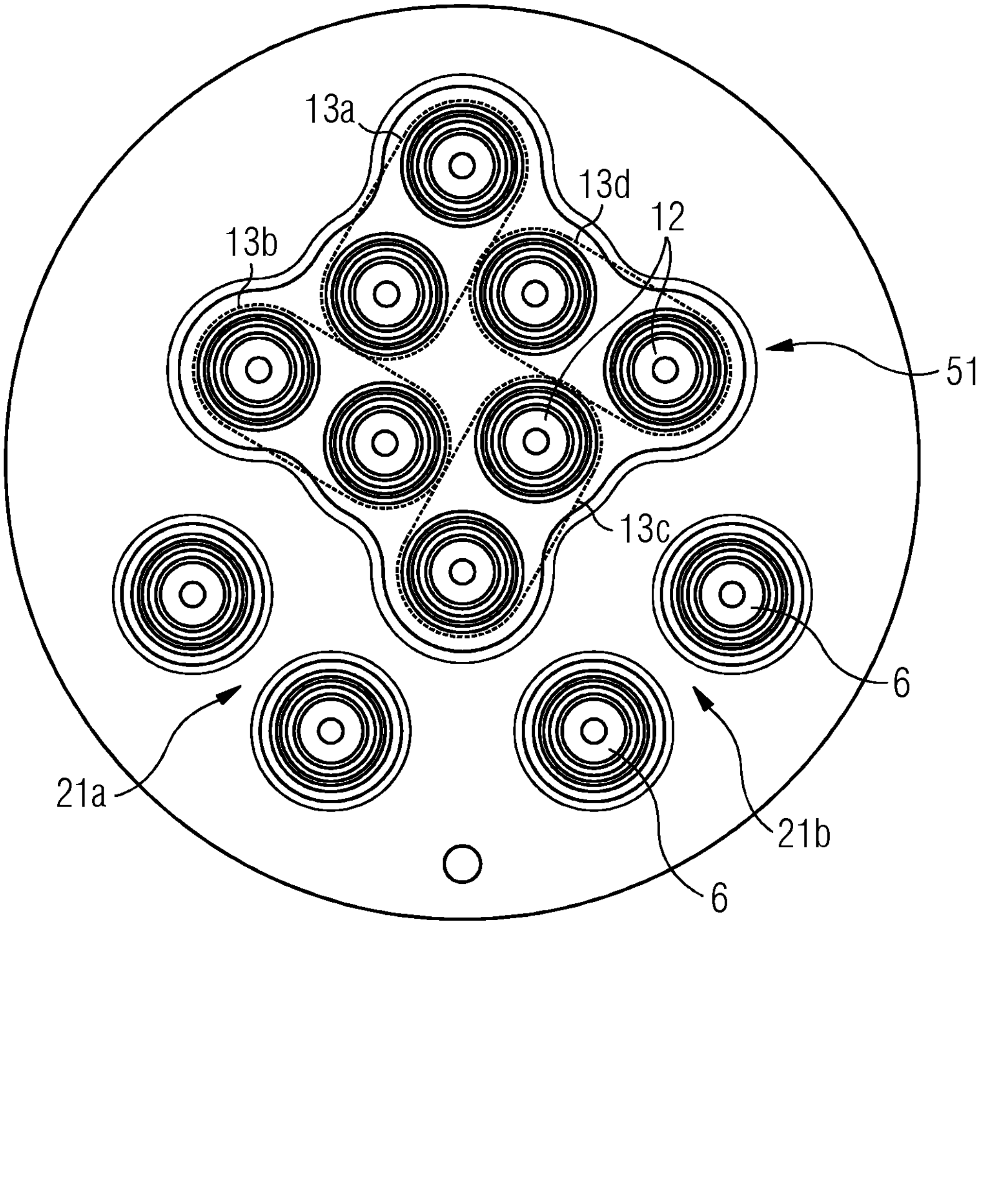
FIG. 3 shows the arrangement of FIG. 2 with data pair connections and power connections, in more detail.

FIG. 2 illustrates more detail of the relative arrangement of the communications pins 23 and power pins 6 within the plug and receptacle bodies 9, 10. FIG. 2 illustrates the back end of the receptacle 2 with relative locations of the communications and power pins. The plug backend (not shown) is a mirror image of this. The contacts 12 at the rear end of the receptacle pins that connect to each core of the 8-core communications cable 4 are arranged to be physically separated from the contacts for the power pin cores 6 within the receptacle body 10. The physical separation includes provision of an electrical shielding layer around the outside of the moulded body 33 in which the conductive cores are arranged. All data cores 23 and contacts 12 are arranged in pairs. The separation of the power conductor pairs from one another is typically greater than the separation of the data connection pairs from one another, as power conductors tend to require more insulation. This distinction in pitch of power relative to data allows greater overall compactness than if all conductors were at the power pair pitch. The pairing of the cores, or contacts can be seen better in FIG. 3 showing the orthogonal layout of the data pair connections and physical separation of the power connections, both from each other and from the data cores, or contacts. Four pairs 13*a*, 13*b*, 13*c*, 13*d* of data communication contacts 12 are arranged orthogonally. The same arrangement applies for the data cores 23 that are inserted into those contacts 12, i.e., for two cores adjacent to one another and forming a pair, a line at any point along the length of the cores, passing through both cores and through each centre line of each core, perpendicular to the centreline of each core is perpendicular to the equivalent line running through the adjacent pair, to minimise inductive and capacitive coupling effects, leading to reduced communication bandwidth through crosstalk. The power connectors 6 are also paired 21*a*, 21*b*. The separation between cores of one pair 21*a* and the other pair 21*b* is the same, but the separation of one pair from another is made as large as possible, whilst still meeting the need to keep as far away from the data cluster 50 as possible, within the limitations of the connector plug or receptacle body dimensions.

Figure 4:
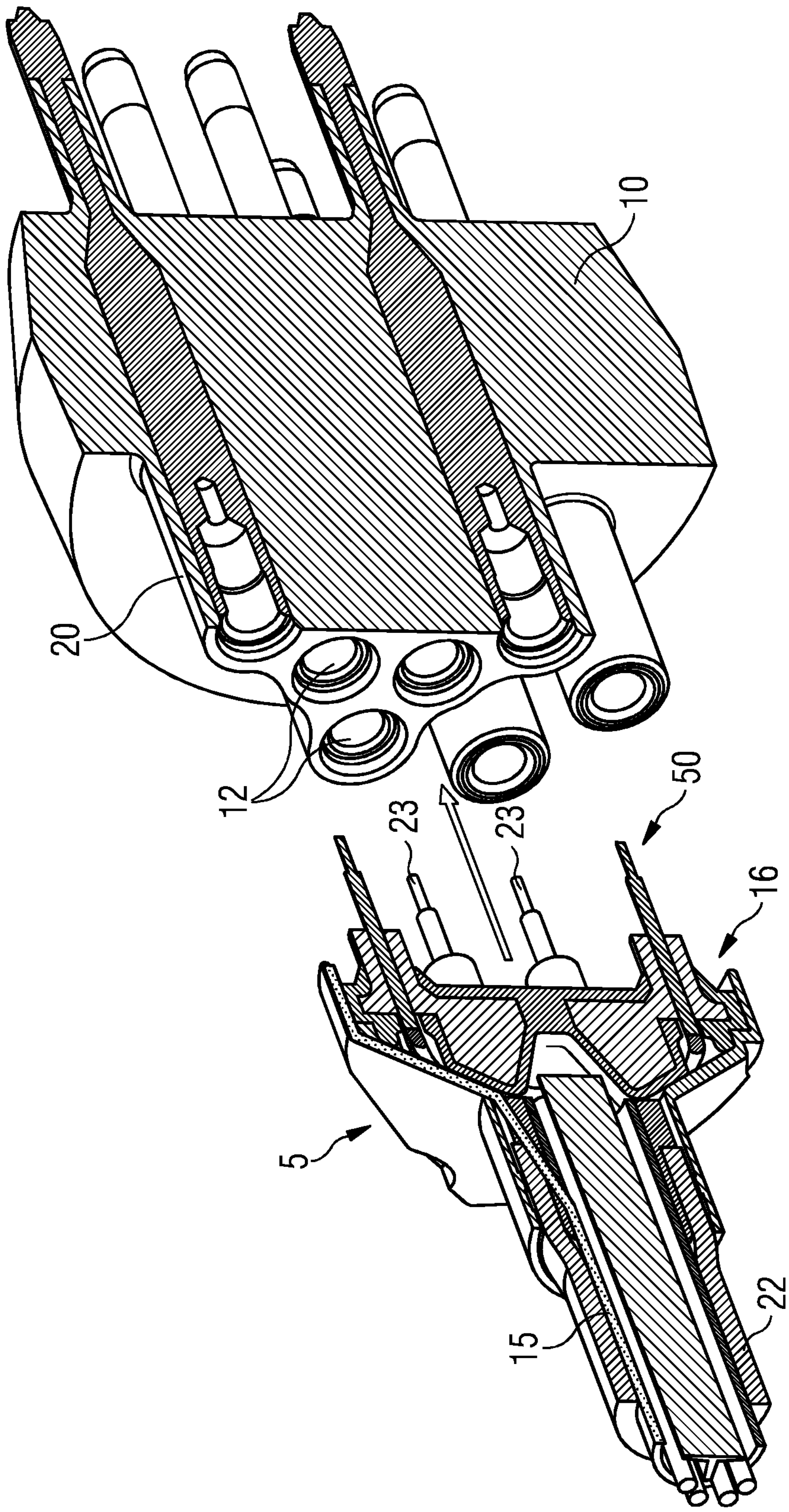
FIG. 4 illustrates an example of how earth screen continuity is provided between a cable and breakout region in a connector according to the invention.

Further details of the connector can be understood from FIG. 4, which illustrates earth screen continuity 15 from the earth screen 22 of the cable 4 through to the earth screen extension 5 in the breakout region 16 for the cable cores which connect to electrical contacts 12 in the body 10 of the receptacle 2. The plug backend (not shown) is a mirror image of the receptacle back end of FIG. 4. The communications data cluster earth shield 5 electrically connects to an earth shield extension 24 (shown in FIG. 5) around the data cluster back end 20. Extensions of the shielding 24 into the connector, or around the communications pins within the connector are optional. The earth shield extension 24 may be mounted to the back end 20 of the receptacle body 10. Individual cable cores 23 engage with the electrical contacts 12 at the rear of pins 3 in the receptacle body 10. Each pin 3 receives one core 23 in a hollow in the back end.

Figure 5:
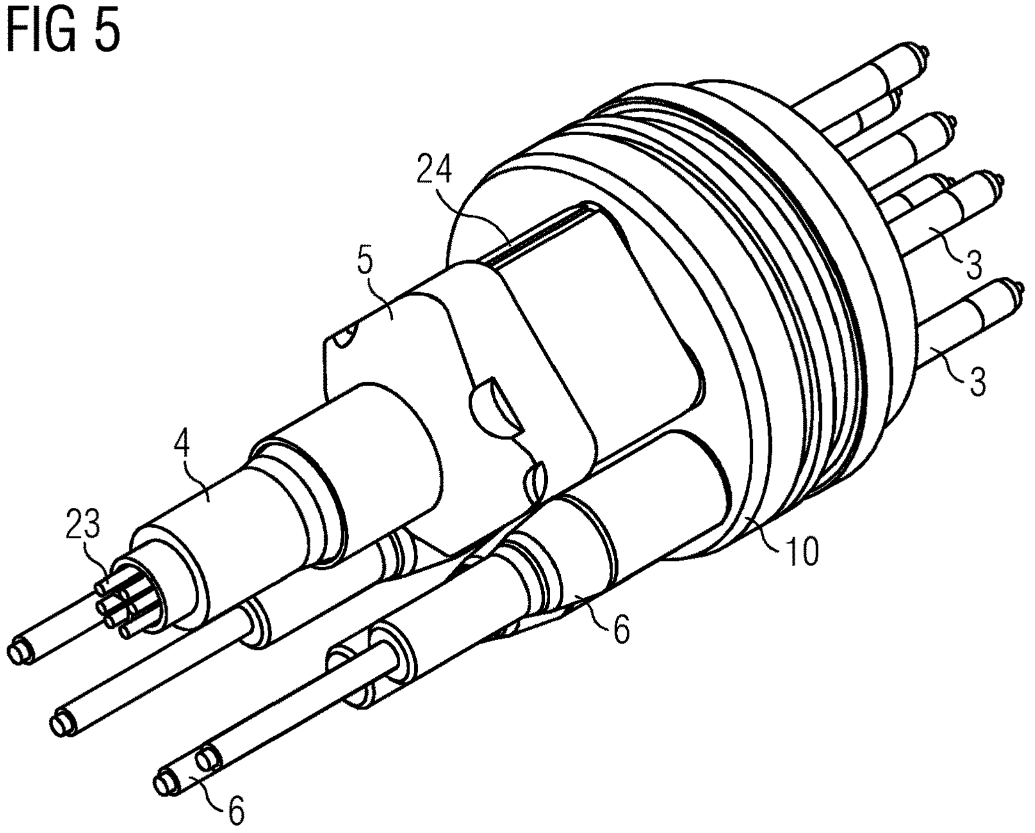
FIG. 5 illustrates an example of an earth screen extension sleeve over a data conductor cluster in the connector of the present invention.
Figure 6:
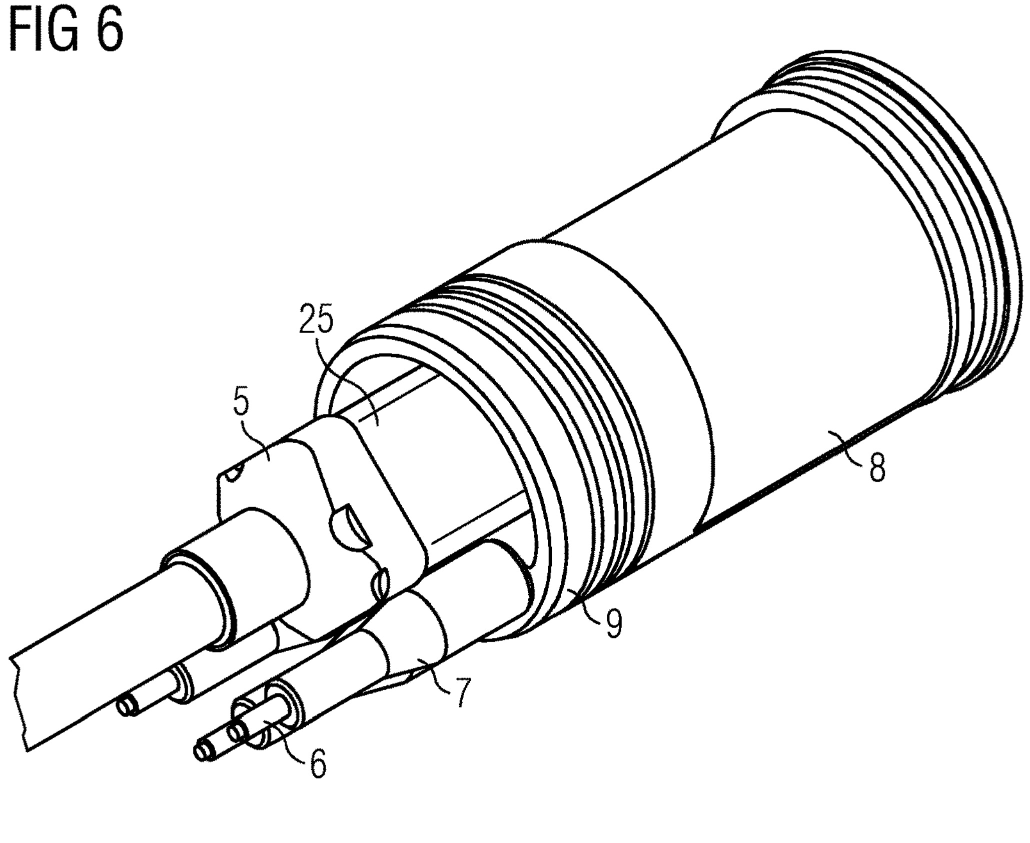
FIG. 6 illustrates the extension sleeve of FIG. 5, recessed into the back of a moulded body.
Figure 7:
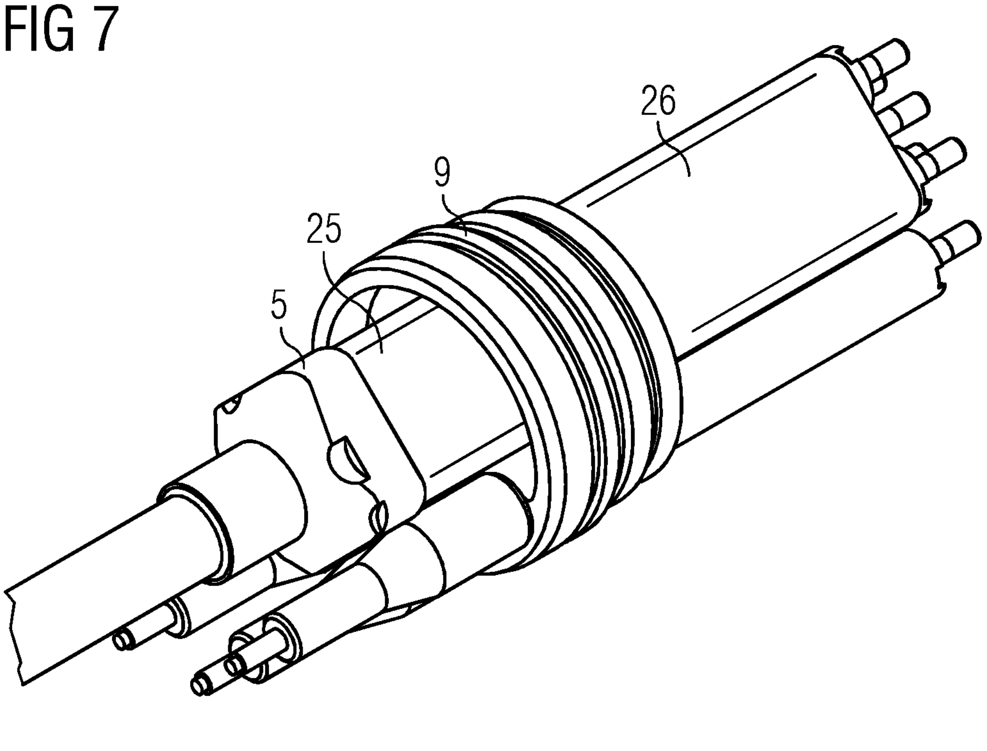
FIG. 7 illustrates the example of FIG. 5 with a front earth screen.
Figure 8:
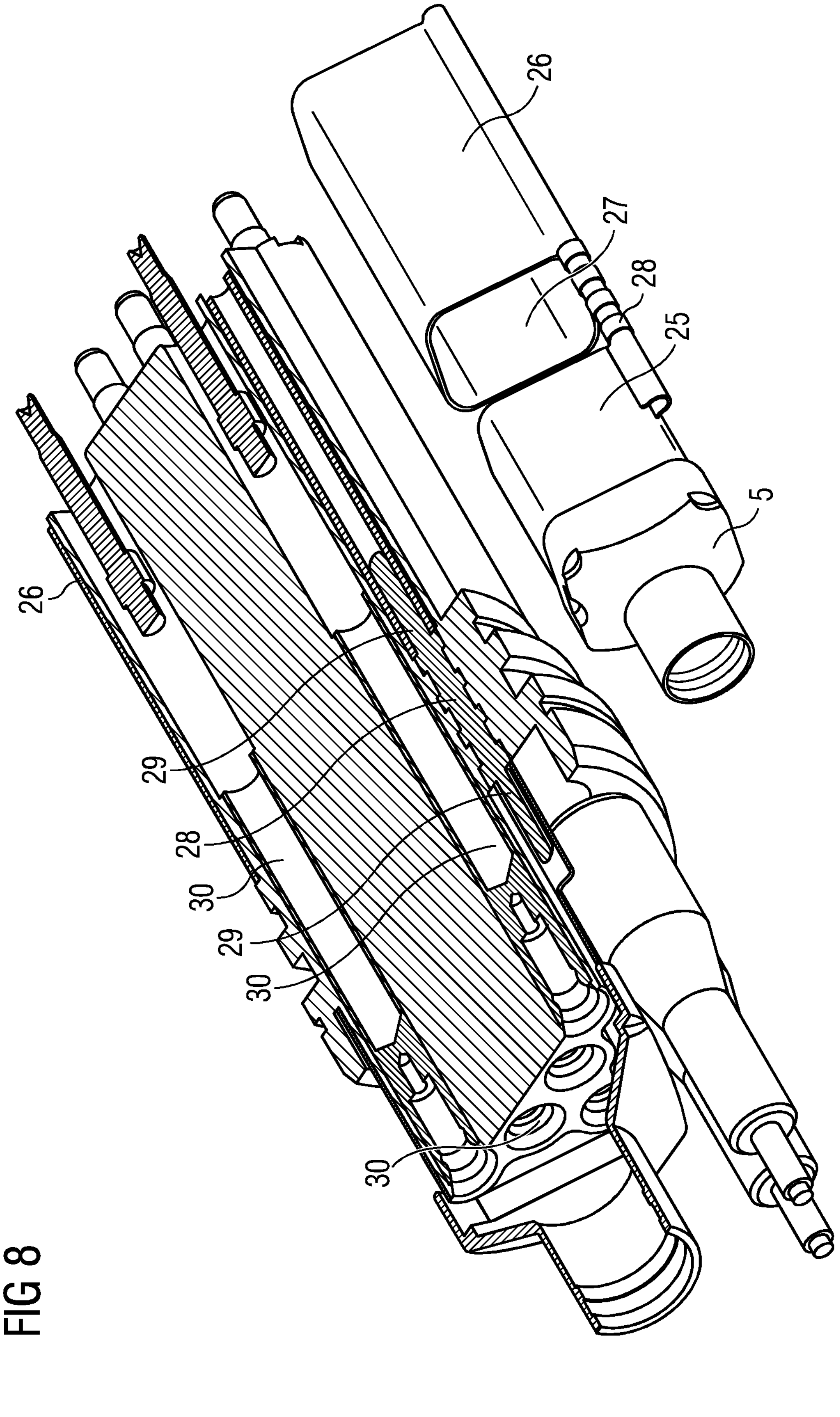
FIG. 8 show how a penetrator pin addition may be provided in a connector according to the present invention, to achieve electrical continuity of the front earth screen of FIG. 7.
Figure 9:
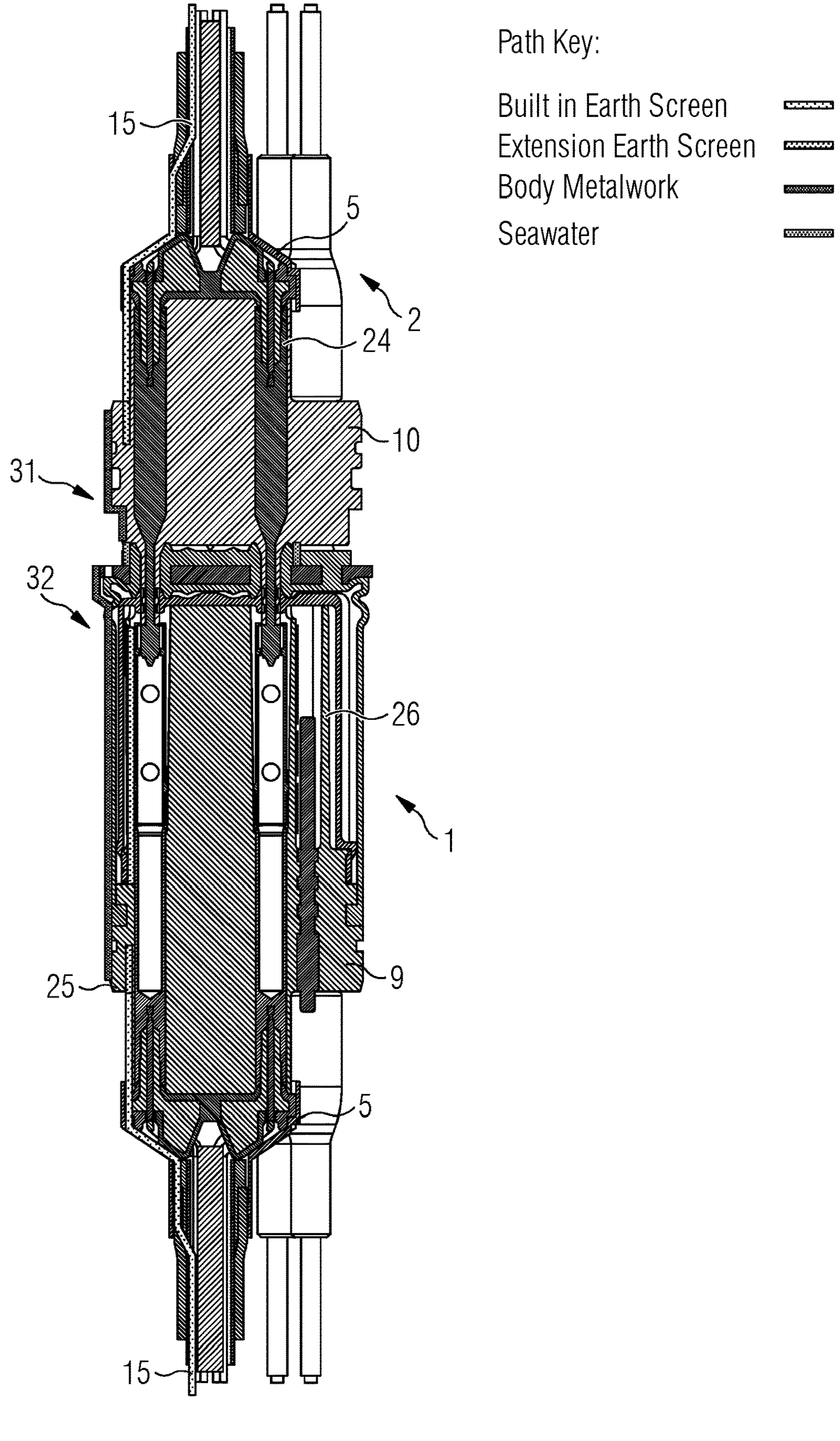
FIG. 9 illustrates a summary of placement of earth screening in a connector according to the present invention to electrically isolate data conductors.

FIG. 5 shows the optional earth screen extension sleeve 24 over the data cluster rear end 20 in the receptacle body 10. The earth screen may be designed to spring open and be captured by the earth cap 5 to provide electrical continuity, or other similar methods may be used to get sufficient electrical contact between the parts. The receptacle moulded body 10 is shown with seals for sealing to a housing (not shown) and the receptacle pins 3 can be seen on the receptacle front end. FIG. 6 shows a plug moulded body 9 with diaphragm 8 at its front end, together with the data cluster cable 4 with its earth screen 5 and an elongated version of the earth screen sleeve 25 recessed into the back of the moulded body 9. Recessing also applied to the receptacle moulded body. The plug backend is a mirror image of receptacle back end. The optional earth screen extension sleeve 25 recessed into the plug moulded body increases the length of the conductors that are protected by the screen. For the plug alone, an additional front earth screen 26 may be provided. The plug rear earth screen extension 25 and plug front earth screen 26 are physically separated by a gap 27 and electrically connected to one another by means of a separate penetrator pin 28 addition, as shown in FIG. 8, to achieve electrical continuity to the front earth screen. Electrical continuity may be achieved by means of a spring contact 29, such as via a Multilam. The plug contacts 30 within the data cluster 51 of the plug are all shielded from the power conductors 6, which may also be individually shielded and separated from the plug data cluster 30, or may simply be separated from the plug data cluster, without individual power conductor shielding. As can be seen in FIG. 9, showing the plug 1 and receptacle 2, fully mated, the front earth screen 26 and rear earth screen 25 in a connector according to the present invention are used to electrically isolate the data conductors. Earth continuity is provided from the earth screen 15 of the cable through the data cluster screen 5 to the extension piece 24 and outer metal housing 31 in the receptacle. In the plug, earth continuity is provided from the earth screen 15 of the cable and the data cluster screen 5, via extension piece 25, outer metal housing 32 and forward extension piece 26.

The present invention reduces cross talk and interference by means of the orthogonal arrangement of data conductors within the data cluster and the physical separation and screening of the data conductors in the data cluster from the power conductors. Further improvements may be achieved using the earth screen extensions from the cable screen at the back end of the plug and receptacle, as well as the additional front end screen on the plug conductors. Although the additional screening is optional, use of some or all of these options give performance benefits over the orthogonal data cluster arrangements alone.

In a typical subsea wet mateable connector plug part according to the invention, a plug body is provided with four or more data conductor contacts arranged in the plug body, the data conductor contacts comprising an even number of pairs of data conductor contacts forming a data cluster and each pair being aligned orthogonally with respect to an adjacent pair of data conductor contacts. The data cluster comprises an outer earth screen adapted to maintain an electrical contact with an earth screen of a cable, when the cable has been fitted, typically by means of a dry mate connection, or by soldering. Typically, there are also multiple power conductor contacts arranged in the plug body, the power conductor contacts being spaced from one another in the plug body and being outside of and remote from the outer earth screen of the data cluster. An optional plug data cluster earth screen extension, electrically coupled to the outer earth screen and recessed in the plug body, provides electrical continuity between an earth screen of a cable dry mated to the connector and a dry mate connector cap of the plug part. In addition, for the plug part, there is the option of adding a plug data cluster front end earth screen, electrically coupled to the earth screen extension and/or outer earth screen and wrapped around the plug data contacts rearward of tips of the plug data contacts to provide screening for the conductors within the connector body.

When using this front end earth screen with the plug, there is an insulating gap between the two screens, which needs to be bridged. This can be done with an electrical penetrator pin mounted radially outwardly of the front end earth screen and earth screen extension to provide electrical continuity between the front end earth screen and earth screen extension. The front end earth screen may comprise an electrically conducting metallic sheet wrapped around at least a part of the length of the data cluster contacts. Outside the plug moulded body and seals, a plug housing, typically metallic protects the plug components and elastomeric diaphragm, which is mounted radially outward of the plug moulded body.

A corresponding subsea wet mateable connector receptacle body is provided with at least four data conductor pins, although more typically eight, as well as several power conductor pins. Typically, the data conductor pins comprise an even number of pairs of data conductor pins, each pair being aligned orthogonally with respect to an adjacent pair of data conductor pins and arranged so as to form a data cluster. The power conductor pins are spaced from one another in the receptacle body, outside of and remote from the data cluster. In the receptacle back end, data cluster contacts corresponding to the data conductor pins of the data cluster are protected by an earth screen extension, adapted to be electrically coupled to an outer earth screen of a cable. On the outside of the receptacle body, seals seal a receptacle housing to the receptacle body. To increase the power rating, the power conductor pins may have a greater diameter than the plug conductor pins and the diameter of the contacts within the plug may be adapted accordingly, but this adds cost and complication, so advantageously, the power conductor pins and the plug conductor pins have the same diameter.

A wet mateable connector comprises a plug part and a receptacle part as described and in use may be coupled, for example by soldering or dry mated, at their back ends to data cables and power cables. Each power conductor contact and data conductor contact of the plug is coupled to a single core of the respective data cables and each power conductor pin and data conductor pin of the receptacle is coupled to a single core of the respective power cables.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope of the invention in its aspects.

It should be noted that the term "comprising" does not exclude other elements or steps and "a" or "an" does not exclude a plurality. Elements described in association with different embodiments may be combined. It should also be noted that reference signs in the claims should not be construed as limiting the scope of the claims. Although the invention is illustrated and described in detail by the preferred embodiments, the invention is not limited by the examples disclosed, and other variations can be derived therefrom by a person skilled in the art without departing from the scope of the invention.

The invention claimed is:

1. A subsea wet mateable connector plug part, comprising:
a plug body;
a plurality of data conductor contacts arranged in the plug body;
a plurality of power conductor contacts arranged in the plug body;
wherein the data conductor contacts comprise an even number of pairs of data conductor contacts, each pair being aligned orthogonally with respect to an adjacent pair of data conductor contacts;
wherein the pairs of data conductor contacts so arranged, form a data cluster;
wherein the data cluster comprises an outer earth screen adapted to maintain an electrical contact with an earth screen of a cable; and
wherein the power conductor contacts are spaced from one another in the plug body, outside of and remote from the outer earth screen of the data cluster;
wherein the plug part further comprises:
a plug data cluster earth screen extension, electrically coupled to the outer earth screen and recessed in the plug body; and
a plug data cluster front end earth screen, electrically coupled to the plug data cluster earth screen extension and/or to the outer earth screen and wrapped around the data conductor contacts rearward of tips of the data conductor contacts.

2. The plug part according to claim 1, further comprising:
an electrical penetrator pin mounted radially outwardly of the plug data cluster front end earth screen and the plug data cluster earth screen extension to provide electrical continuity between the plug data cluster front end earth screen and the plug data cluster earth screen extension.

3. The plug part according to claim 2,
wherein the plug data cluster front end earth screen comprises a metallic sheet surrounding at least a part of the length of the data conductor contacts.

4. The plug part according to claim 1, further comprising:
a plug housing; and
seals to seal the plug body in the plug housing.

5. The plug part according to claim 1, further comprising:
an elastomeric diaphragm mounted radially outward of the plug body.

6. A wet mateable connector, comprising:
a plug part, and a receptacle part;
the plug part comprising a plug part according to claim 1;
the receptacle part comprising:
a receptacle body;
a plurality of data conductor pins arranged in the receptacle body;
a plurality of power conductor pins arranged in the receptacle body;
wherein the data conductor pins comprise an even number of pairs of data conductor pins, each pair being aligned orthogonally with respect to an adjacent pair of data conductor pins;
wherein the pairs of data conductor pins so arranged form a receptacle data cluster;
wherein the receptacle data cluster comprises a receptacle outer earth screen adapted to maintain an electrical contact with an earth screen of a cable; and,
wherein the power conductor pins are spaced from one another in the receptacle body, outside of and remote from the receptacle data cluster.

7. A wet mateable connector arrangement, comprising:
a connector according to claim 6;
wherein the connector further comprises a first data cable coupled to the plug part and a second data cable coupled to the receptacle part; a first power cable coupled to the plug part and a second power cable coupled to the receptacle part.

8. The wet mateable connector arrangement according to claim 7,
wherein each power conductor contact and data conductor contact of the plug part is coupled to a single core of the respective first data cables and each power conductor pin and data conductor pin of the receptacle part is coupled to a single core of the respective second data cables.

9. The wet mateable connector arrangement according to claim 8,
wherein the contacts and the pins are coupled by a dry-mate or solder.

* * * * *